United States Patent
Tsuji et al.

(10) Patent No.: US 7,287,972 B2
(45) Date of Patent: Oct. 30, 2007

(54) MOLD CLAMPING APPARATUS AND MOLDING MACHINE

(75) Inventors: Makoto Tsuji, Kanagawa (JP); Saburo Noda, Kanagawa (JP); Shinya Itani, Kanagawa (JP); Masaki Yashiro, Kanagawa (JP); Hiroshi Yokoyama, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 292 days.

(21) Appl. No.: 11/091,922

(22) Filed: Mar. 29, 2005

(65) Prior Publication Data

US 2005/0226958 A1   Oct. 13, 2005

(30) Foreign Application Priority Data

Apr. 13, 2004 (JP) ............................. 2004-117968
Feb. 21, 2005 (JP) ............................. 2005-044365

(51) Int. Cl.
*B29C 45/76* (2006.01)
*B22D 17/26* (2006.01)

(52) U.S. Cl. ................. 425/149; 164/154.2; 164/154.8; 164/343; 425/150; 425/451.9; 425/595

(58) Field of Classification Search ............... 425/149, 425/150, 190, 595, 451.9; 264/40.5; 164/154.2, 164/154.8, 343
See application file for complete search history.

(56) References Cited

U.S. PATENT DOCUMENTS 7,001,545 B2 * 2/2006 Okado et al. ............... 425/149

FOREIGN PATENT DOCUMENTS

JP   08-267212 A   10/1996

* cited by examiner

*Primary Examiner*—James Mackey
(74) *Attorney, Agent, or Firm*—Pillsbury Winthrop Shaw Pittman, LLP

(57) ABSTRACT

To provide a mold clamping apparatus able to suppress spout of a molding material from between mating faces of dies and to extend the lifetime of the dies. A mold clamping apparatus has a control apparatus deciding a distribution of a load divided by a plurality of tie bars based on information concerning to the die and controlling pressure of driving oil of a cylinder chamber of each cylinder for mold clamping independently to become a load having a determined distribution.

9 Claims, 11 Drawing Sheets

MOLD CLAMPING APPARATUS AND MOLDING MACHINE

BACKGROUND OF THE INVENTION

CROSS REFERENCE TO RELATED APPLICATIONS

This application claims the benefit of priority of Japanese Patent Application No. 2004-117968, filed in Japan on Apr. 13, 2004 and Japanese Patent Application No. 2005-044365 filed in Japan on Feb. 21, 2005. The entire contents of each of these applications are incorporated herein by reference.

1. Field of the Invention

The present invention relates to a mold clamping apparatus of a molding machine such as a die casting machine and a molding machine.

2. Description of the Related Art

A mold clamping machine apparatus used for a molding machine such as a die casting machine has a fixed die plate holding one of pair of dies and a movable die plate holding the other, when clamping mold, after positioning the movable die plate at a position depending on the thickness of the die (die height), force is made act between the movable die plate and the fixed die plate and clamping mold of the die is performed.

This clamping mold is performed by, for example, making a tension generate at a plurality of tie bars provided between the movable die plate and the fixed die plate.

Usually, a plurality of tie bars are arranged at a symmetrical position for the center part of the movable die plate and the fixed die plate so that a distribution of force acting between mating faces of the die becomes uniform and distribute a load of the same magnitude to each tie bar.

Kokai (Japanese unexamined patent publication) No. H8(1996)-267212 discloses a technology of providing an apparatus giving a load between the fixed die plate and the movable die plate besides the tie bars so that a distribution of force acting between mating faces of the die becomes uniform.

Meanwhile, even if clamping mold by making the magnitude of a load of each tie bar the same, until an arrangement of a cavity is symmetry, a distribution of force acting between the mating faces of the die does not become uniform. When this distribution of the force acting between the mating faces is nonuniform, it may be possible to spout a molding material injected and filled to the cavity from between the mating faces and to become burr. In particular, about the die cast machine, since the molding material is a metal, the mass is large, and force to which the die is subjected when a molten metal is injected and filled in the cavity is substantially large in compared with the other molding material such as a resin. Therefore, opening mold of the dies is easy to occur, the molten metal spouts easily.

On the contrary, when the molding material spouts between the mating faces in a casting cycle, if a load of a plurality of tie bars are increased without exception and mold clamping force is raised for preventing the above disadvantage, an excess load is applied to the die and it may be possible to shorten the lifetime of the die.

SUMMARY OF THE INVENTION

An object of the invention is to provide a mold clamping apparatus enabling to suppress spout of a molding material between mating faces of dies and enabling to extend the lifetime of a die.

A mold clamping apparatus according to a first aspect of the present invention has a fixed die plate fixed on a base and holding one of pair of dies, a movable die plate holding the other of pair of the dies and provided in the opening or closing direction on the base movably, a plurality of tie bars having pistons and coupled sections and dividing mold clamping force given to the dies between the pistons and the coupled sections, a plurality of cylinders for mold clamping equipped in either of the fixed die plate or the movable die plate, accommodating the pistons of a plurality of the tie bars respectively, and to which pressured operating fluid for generating the mold clamping force is supplied, a plurality of uniting units being equipped in the other of the fixed die plate or the movable die plate and uniting releasably with a plurality of the tie bars respectively by meshing with coupled sections of a plurality of the tie bars respectively, a tie bar load distribution unit for deciding a distribution of a load divided by a plurality of the tie bars based on information concerning the dies, and a control unit for controlling pressure of the operating fluid of a plurality of the cylinder for mold clamping independently to become the load of the decided a distribution.

A mold clamping apparatus according to a second aspect of the present invention is a mold clamping apparatus of a molding machine injecting and filling a molding material to the cavity defined by pair of dies, wherein a mold clamping apparatus has a fixed die plate fixed on a base and holding one of pair of dies, a movable die plate holding the other of pair of the dies and provided in the opening or closing direction on the base movably, a plurality of tie bars having pistons and coupled sections and dividing mold clamping force given to the dies between the pistons and the coupled sections, a plurality of cylinders for mold clamping equipped in either of the fixed die plate or the movable die plate, accommodating the pistons of a plurality of the tie bars respectively, and to which pressure-adjusted operating fluid for generating the mold clamping force is supplied, a plurality of uniting units being equipped in the other of the fixed die plate or the movable die plate and uniting releasably with a plurality of the tie bars respectively by meshing with coupled sections of a plurality of the tie bars respectively, a displacement detection unit for detecting displacement of the piston of a plurality of the tie bars generated by injection and filling of a molding material to the cavity, and a control unit adjusting pressure of the operating fluid supplied to a plurality of the cylinder for mold clamping independently to suppress displacement detected by the displacement detection unit.

In the first aspect of the present invention, a distribution of a load divided by a plurality of the tie bars is adjusted independently based on information concerning the dies such as shape information, mounting position information of the dies and so on, and a distribution of pressure acting to between mating faces of the dies is uniformized.

In the second aspect of the present invention, when mold opening of the dies is generated and a molding material is spout from between the mating faces of the dies by injection and filling of the molding material to the cavity, displacement of the pistons of each tie bar is detected by the displacement detection unit. The control unit controls pressure of the operating fluid supplied to each cylinder for mold clamping independently, displacement generated in the pistons of each tie bar is suppressed and spout from between the mating faces of the dies of the molding materials is suppressed.

A mold clamping apparatus according to a third aspect of the present invention has a fixed die plate fixed on a base and holding one of pair of dies, a movable die plate holding the other of pair of the dies and provided in the opening or closing direction on the base movably, a plurality of tie bars having pistons and coupled sections and dividing mold clamping force given to the dies between the pistons and the coupled sections, a plurality of cylinders for mold clamping equipped in either of the fixed die plate or the movable die plate, accommodating the pistons of a plurality of the tie bars respectively, and to which pressured operating fluid for generating the mold clamping force is supplied, a plurality of uniting units being equipped in the other of the fixed die plate or the movable die plate and uniting releasably with a plurality of the tie bars respectively by meshing with coupled sections of a plurality of the tie bars respectively, a tie bar load distribution unit for deciding a distribution of a load divided by a plurality of the tie bars based on information concerning the dies, a control unit for controlling pressure of the operating fluid of a plurality of the cylinder for mold clamping independently to become the load of the decided distribution, an injection sleeve coupled with a cavity defined by pair of the dies via an inlet provided in one of pair of the dies, and an injection plunger advancing in the injection sleeve and injecting and filling a molding materials to the cavity, wherein the fixed die plate is possible to hold the either die at a plurality of positions in a direction perpendicular to the opening or closing direction, and the movable die plate is possible to hold the other die at a plurality of positions in a direction perpendicular to the opening or closing direction.

Preferably, the fixed die plate has a plurality of T-groove arranged parallel and able to insert a bolt head of a bolt fixing the either die for the fixed die plate, the movable die plate has a plurality of T-groove arranged parallel and being able to insert a bolt head of a bolt fixing the other die for the fixed die plate, a plurality of the T-grooves of the fixed die plate is formed in a range wider than width of the either die in an arrangement direction, and a plurality of the T-grooves of the movable die plate is formed in a range wider than width of the other die in an arrangement direction.

Preferably, information concerning the dies includes information of a position of the inlet.

A mold clamping apparatus according to a fourth aspect of the present invention has a fixed die plate fixed on a base and holding one of pair of dies, a movable die plate holding the other of pair of the dies and provided in the opening or closing direction on the base movably, a plurality of tie bars having pistons and coupled sections and dividing mold clamping force given to the dies between the pistons and the coupled sections, a plurality of cylinders for mold clamping equipped in either of the fixed die plate or the movable die plate, accommodating the pistons of a plurality of the tie bars respectively, and to which pressured operating fluid for generating the mold clamping force is supplied, a plurality of uniting units being equipped in the other of the fixed die plate or the movable die plate and uniting releasably with a plurality of the tie bars respectively by meshing with coupled sections of a plurality of the tie bars respectively, a tie bar load distribution unit for deciding a distribution of a load divided by a plurality of the tie bars based on information concerning the dies, and a control unit for controlling pressure of the operating fluid of a plurality of the cylinder for mold clamping independently to become the load of the decided distribution, wherein the fixed die plate is possible to hold the either die at a plurality of positions in a direction perpendicular to the opening or closing direction, and the movable die plate is possible to hold the other die at a plurality of positions in a direction perpendicular to the opening or closing direction.

BRIEF DESCRIPTION OF THE DRAWINGS

These and other objects and features of the present invention will become clearer from the following description of the preferred embodiments given with reference to the accompanying drawings, in which:

FIG. 5A is a sectional view and FIG. 5B is a sectional view in a direction of A-A' line of FIG. 5A;

DESCRIPTION OF THE PREFERRED EMBODIMENTS

Preferred embodiments of the present invention will be described with reference to the accompanying drawings.

First Embodiment

Figure 1:
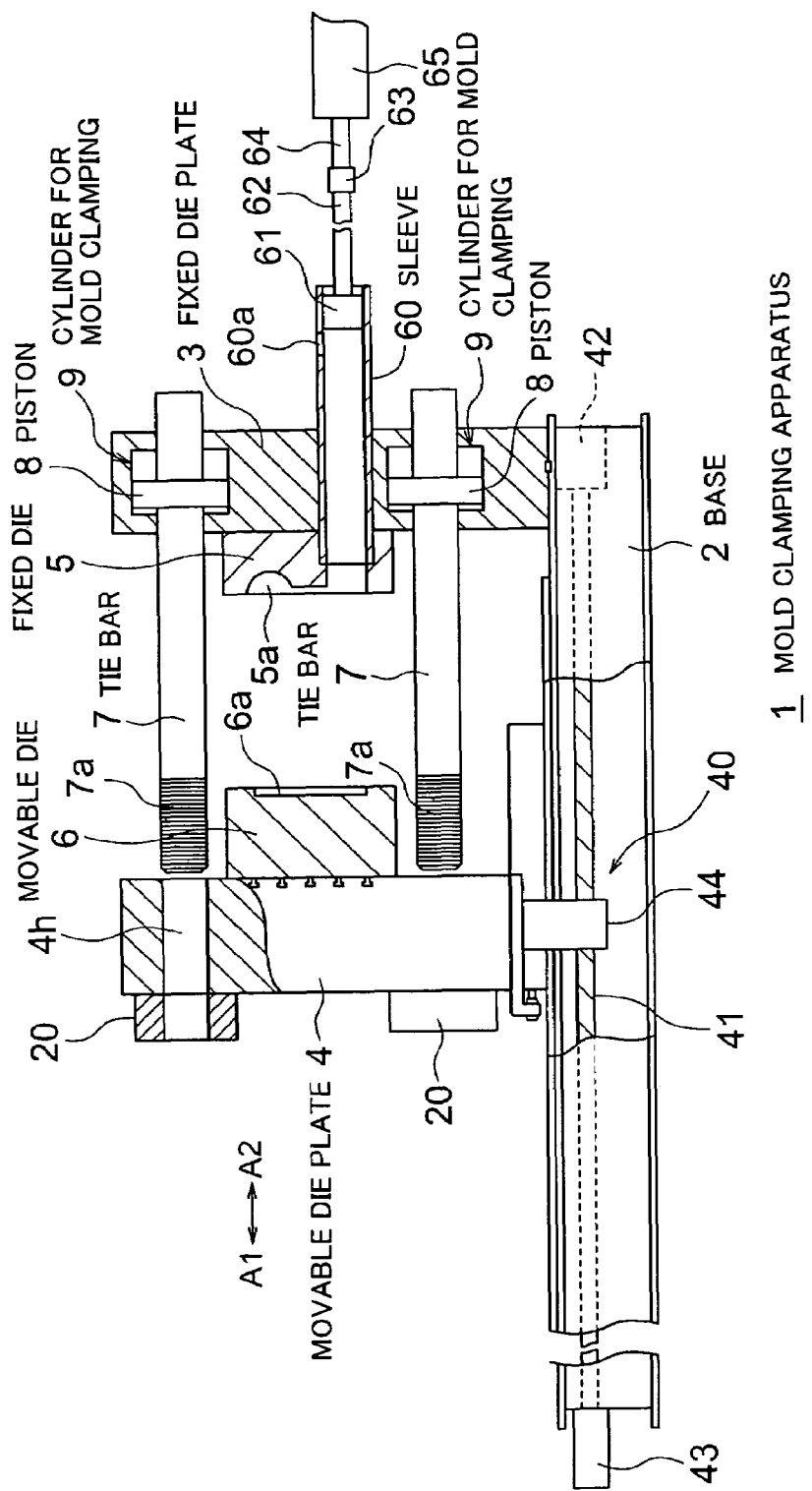
FIG. 1 is a front view partly including a sectional view showing a constitution of a mechanical portion of a mold clamping apparatus according to a first embodiment of the present invention.
Figure 2:
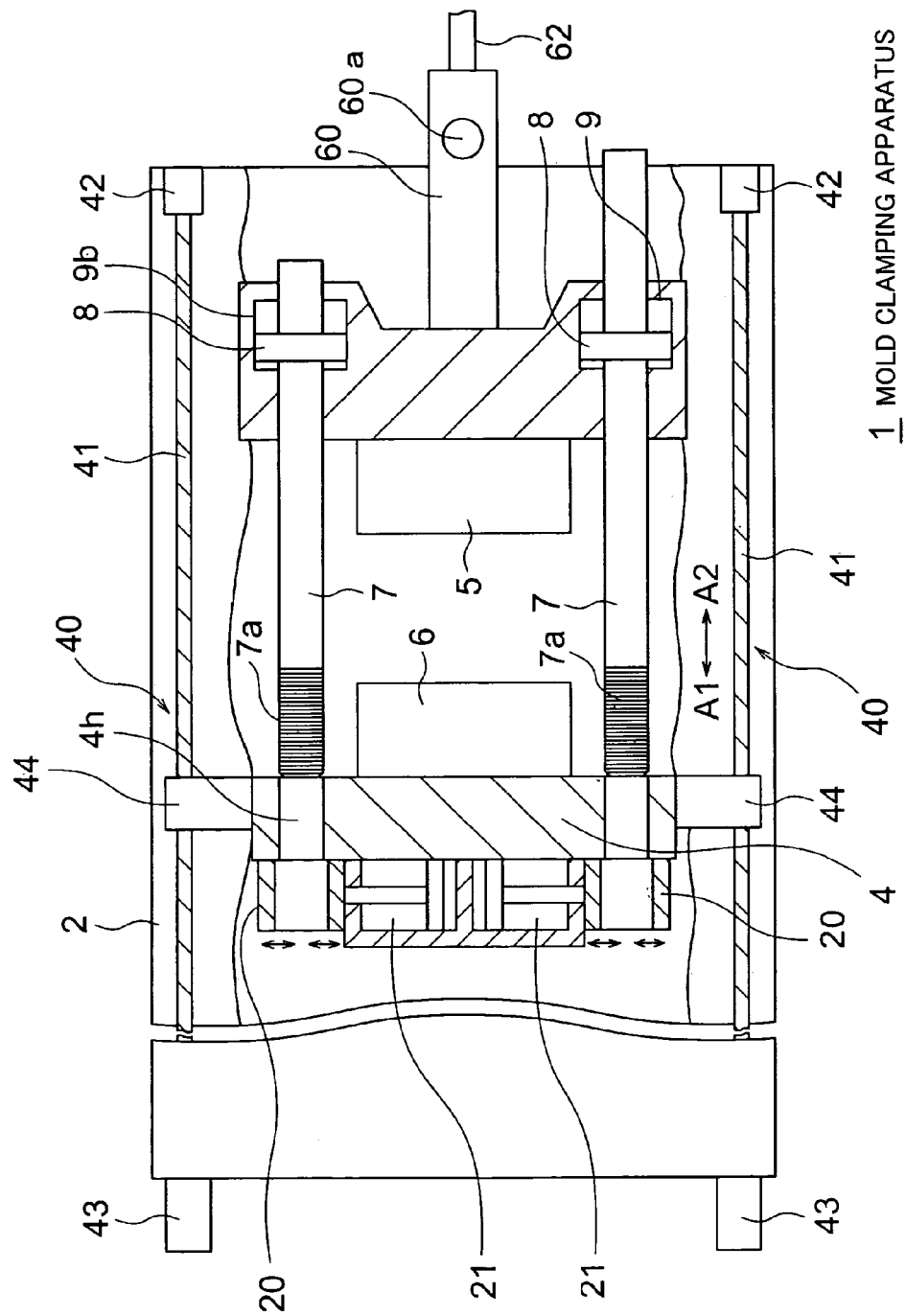
FIG. 2 is a view that the mold clamping apparatus shown in FIG. 1 is seen from the upper side.

FIG. 1 is a front view partly including a sectional view showing a constitution of a mechanical portion of a mold clamping apparatus according to an embodiment of the present invention. Further, FIG. 2 is a view that the mold clamping apparatus shown in FIG. 1 is seen from the upper side.

Note that, in the present embodiment, it will be explained when a mold clamping apparatus is applied to, for example, a die casting machine.

A mold clamping apparatus 1 has a fixed die plate 3, a movable die plate 4, a tie bar 7, a cylinder for mold clamping 9, a movement mechanism 40 and a half nut 20.

Note that, the half nut 20 is an embodiment of a coupling section of the present invention.

The fixed die-plate 3 is fixed on a base 2. The fixed die plate 3 holds a fixed die 5 in a foreside.

The movable die plate 4 holds a movable die 6 in a foreside (a side opposite to the fixed die plate 3). This movable die plate 4 is movably arranged in an opening direction A1 and a clamping direction A2 on the base 2. In the movable die plate 4, a through-hole 4h into which the tie bar 7 is inserted is formed. This through-hole 4h is formed, for example, in four corners of the movable die plate 4.

By clamping pair of dies of the fixed die 5 and the movable die 6, a cavity is defined between a recess 5a of the fixed die 5 and a recess 6a of the movable die 6.

In a backside of the fixed die plate 3, a sleeve 60 is arranged. A plunger tip 61 is fitted in the sleeve 60, and a plunger rod 62 is coupled with a piston rod 64 of an injection cylinder 65 via a coupling 63, where the plunger tip 61 is coupled to a tip of the plunger rod 62.

The injection cylinder 65 is driven by pressurized oil and it elongates and contracts to the piston rod 64.

By advancing the piston rod 64 in a condition that a molten metal ML is supplied to the sleeve 60 through a supply port 60a, the molten metal ML as an example of a molding material is injected and filled to the cavity defined between the clamped fixed die 5 and the movable die 6.

The tie bar 7 is supported horizontally by the fixed die plate 3.

In a free end of the movable die plate 4 side of the tie bar 7, for example, a sawtooth shaped coupled groove 7a is formed. Note that, the coupled groove 7a is an embodiment of a coupled section of the present invention.

In a middle of the tie bar 7, a piston 8 built in the cylinder for mold clamping 9 is provided.

The cylinder for mold clamping 9 is positioned inside of the fixed die plate 3, and the piston 8 is built in this fixed die plate 3 movably. By supplying high-pressurized driving oil to a cylinder chamber of the cylinder for mold clamping 9, force is act between the fixed die plate 3 and the tie bar 7 and the tie bar 7 is driven for the fixed die plate 3.

The tie bar 7 is movable for the fixed die plate 3 in a range of movement of the piston 8 coupled with the tie bar 7, namely, in a range of a stroke of the cylinder for mold clamping 9.

The movement mechanism 40 is built inside the base 2 and it has a screw axis 41, a supporting member 42, a servomotor 43 and a movable member 44.

The supporting member 42 supports an end of the screw axis 41 rotatably.

The other end of the screw axis 41 is coupled with the servomotor 43.

The screw axis 41 is screwed in the movable member 44.

The movable member 44 is fixed in a both side of the movable die plate 4 as shown in FIG. 2.

In this movement mechanism 40, by performing the servomotor 43 rotation control, the screw axis 41 is rotated and this rotation of the screw axis 41 is transformed to a rectilinear motion of the movable member 44. As a result, the movable die plate 4 is driven to the opening direction A1 or the clamping direction A2.

The half nut 20 is arranged behind the through-hole 4h of the movable die plate 4. In this half nut 20, a not-illustrated groove meshing with the coupled groove 7a of the tie bar 7 is formed.

The half nut 20 is opened or closed by a half nut opening or closing cylinder 21. When the half nut 20 is closed and meshed (united) with the coupled groove 7a of the tie bar 7, the tie bar 7 and the movable die plate 4 are coupled. When the half nut 20 is opened, a coupling with the tie bar 7 and the movable die plate 4 is uncoupled. Note that, since the half nut 20 is a known technology, a detailed explanation will be omitted.

Next, a basic action of the mold clamping apparatus 1 will be explained.

The mold clamping apparatus 1 in a state shown in FIG. 1 and FIG. 2 is in a state that the movable die plate 4 is moved in a predetermined opening position. In this state, the piston 8 is positioned as a predetermined position in the cylinder for mold clamping 9.

From this state, by driving the servomotor 43, the movable die plate 4 is moved to the clamping direction A2. The movement speed of the movable die plate 4 is provided at high speed from the viewpoint of reduction of cycle time.

Then, the movable die plate 4 is moved to the clamping direction A2, slowed down at a position just before the fixed die 5 and the movable die 6 are contacted and the fixed die 5 and the movable die 6 are contacted.

As a result, mold clamping of the fixed die 5 and the movable die 6 is ended.

In this state, a position of the piston 8 of each tie bar 7 in the cylinder for mold clamping 9 is adjusted by supplying the driving oil to a cylinder chamber of the cylinder for mold clamping 9 to be a state that the half nut 20 and the coupled groove 7a are possible to be meshed.

Figure 3:
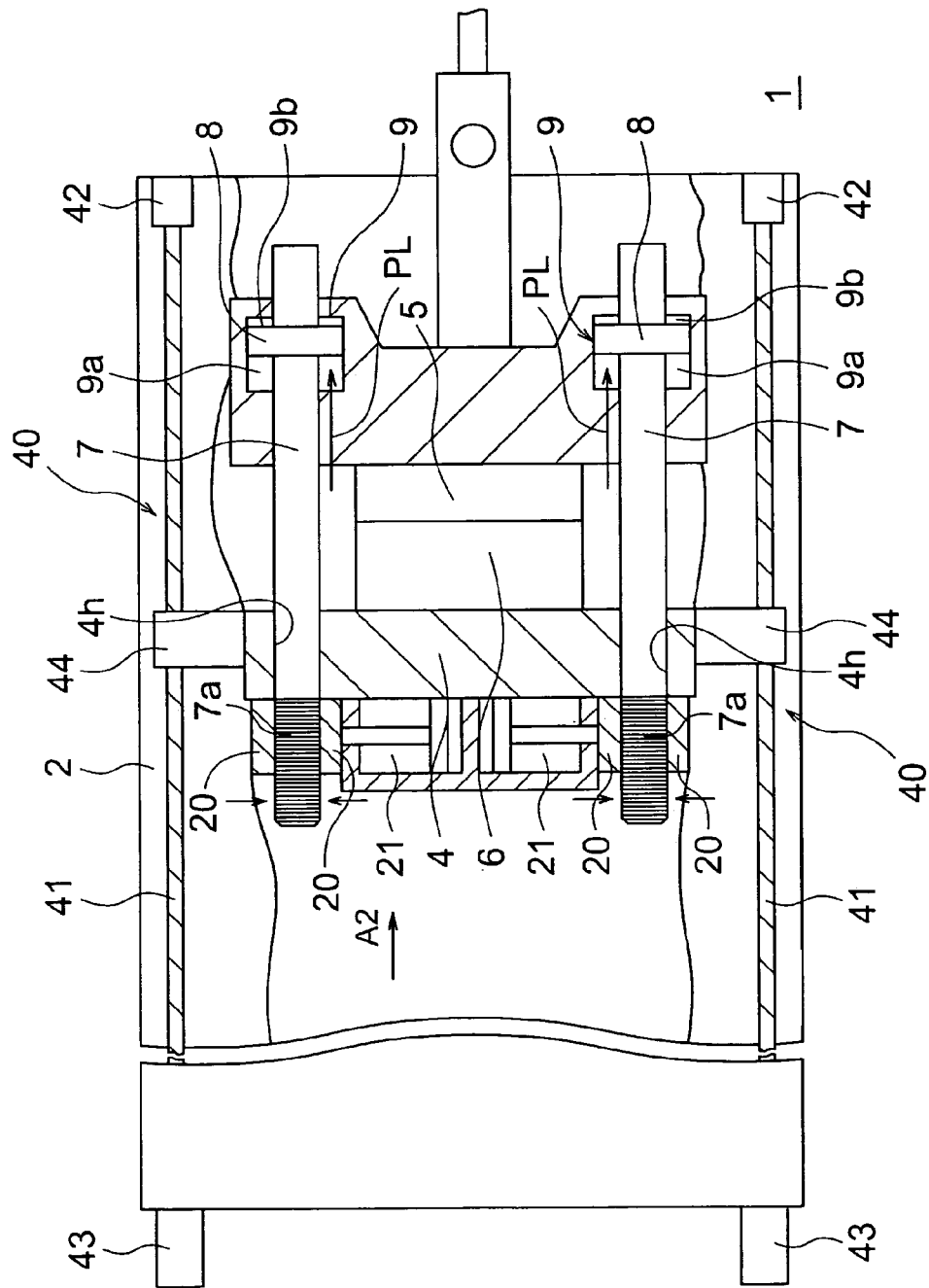
FIG. 3 is a view showing a state of the mold clamping apparatus when mold clamping.

Next, as shown in FIG. 3, the half nut 20 is closed and meshed with the coupled groove 7a of the tie bar 7. As a result, each tie bar 7 and the movable die plate 4 are united.

Further, high-pressurized driving oil PL is supplied to a cylinder chamber 9a in a side of the movable die plate 4 of the cylinder for mold clamping 9 and mold clamping is performed. As a result, the tie bar 7 is extended and mold clamping force is occurred in response to the amount of extension of the tie bar 7.

In this state, by injecting and filling the molten metal ML from the sleeve 60 to the cavity defined between the fixed die 5 and the movable die 6, a die casting product is cast.

Figure 4:
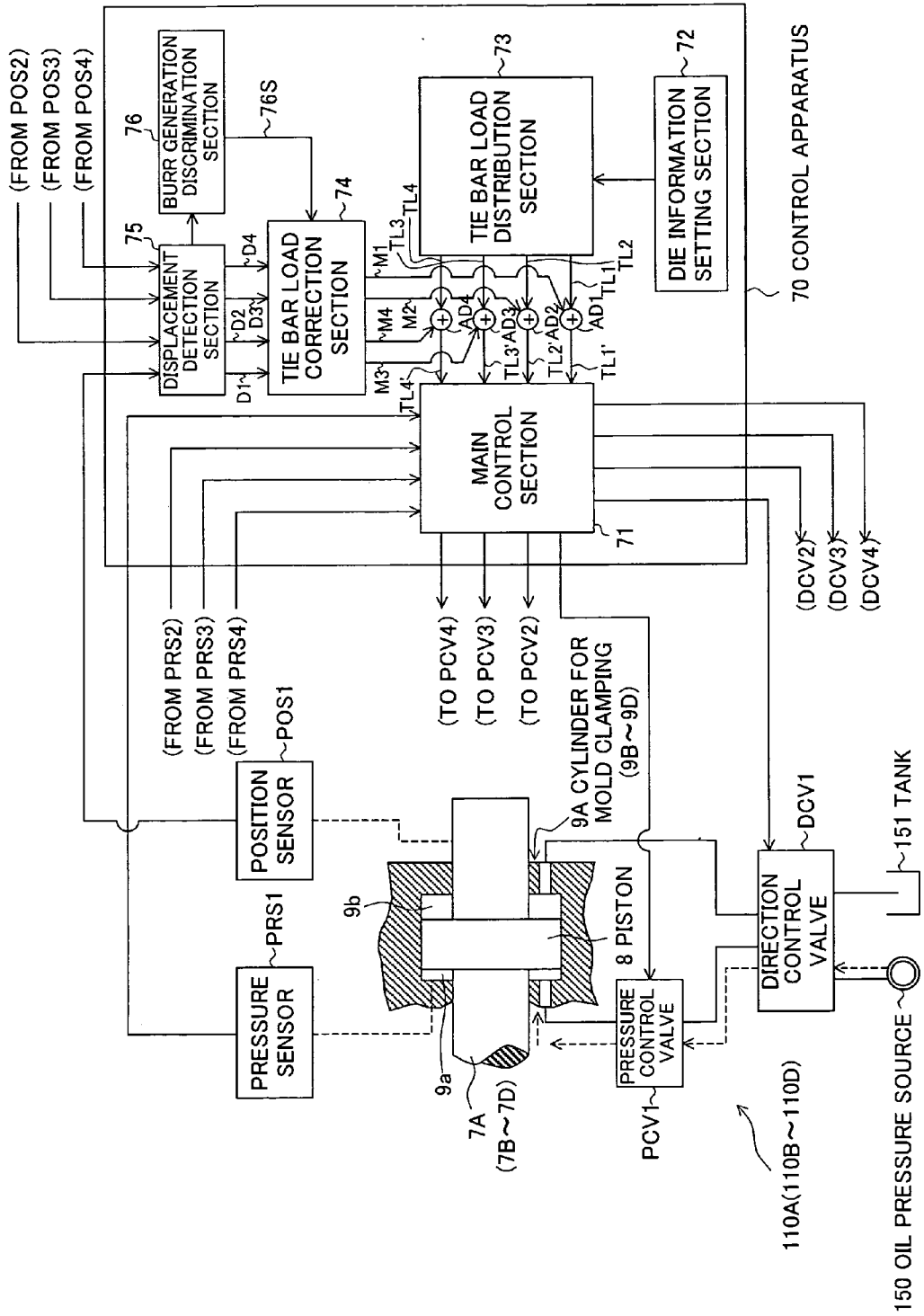
FIG. 4 is a view showing a structure of the vicinity of one cylinder for mold clamping among four cylinders for mold clamping of the mold clamping apparatus and a constitution of a control apparatus.

Here, in FIG. 4, a structure of the vicinity of one cylinder for mold clamping 9A of four cylinders for mold clamping of the mold clamping apparatus 1 and a constitution of a control apparatus 70 will be shown.

As shown in FIG. 4, a hydraulic circuit 110A is coupled with the cylinder for mold clamping 9A. Note that, hydraulic circuits 110B to 110D having the same constitutions are coupled with the other three cylinders for mold clamping 9B to 9D.

This hydraulic circuit 110A has a pressure control valve PCV1 and a direction control valve DCV1.

The direction control valve CDV1 enables the supply of high-pressurized driving oil supplied from a pressurized oil source 150 to one of cylinder chambers 9a or 9b of the cylinder for mold clamping 9A in response to a control command from the control apparatus 70. A main role of this direction control valve DCV1 is a position adjustment of the piston 8 by supplying the driving oil to one of cylinder chambers 9a and 9b of the cylinder for mold clamping 9A.

Namely, because for meshing the half nut 20 and the coupled groove 7a of the tie bar 7, it is necessary to perform a position control of the piston 8 of the tie bar 7 by the direction control valve DVC1 and position it at the position that the half nut 20 meshes with the coupled groove 7a of the tie bar 7.

Note that, the direction control valve DCV1 makes to flow the driving oil from the pressurized oil source 150 toward a tank 151 when not driving the piston 8.

The pressure control valve PCV1 adjusts pressure of the driving oil from the pressurized oil source 150 supplied through the direction control valve DCV1 to pressure necessary for mold clamping in response to a control command from the control apparatus and enables the supply of it to the cylinder chamber 9a when mold clamping.

A pressure sensor PRS1 is provided in the cylinder chamber 9a of the cylinder of mold clamping 9A. Note that, pressure sensors PRS2 to PRS4 equivalent to the pressure sensor PRS1 are provided in cylinder chambers 9a of the other cylinders for mold clamping 9B to 9D.

The pressure sensor PRS1 detects pressure of the driving oil in the cylinder chamber 9a and feeds back the detected pressure to the control apparatus 70.

A position sensor POS1 detecting a position of a posterior end of the tie bar 7A is provided in the side of the cylinder chamber 9b of the cylinder for mold clamping 9A. Note that, position sensors POS2 to POS4 equivalent to the pressure sensor POS are provided in the other tie bars 7B to 7D.

By detecting a position of the posterior end of the tie bar 7A by the position sensor POS1, a position of the piston 8 can be detected. Namely, although the tie bar 7A between the piston 8 and the coupled groove 7a is transformed elasticity when mold clamping, since the posterior end of the tie bar 7A is not transformed when mold clamping, a position of the piston 8 is decided by detecting a position of this posterior end portion.

Position information of the piston 8 detected by the position sensor POS1 is fed back to the control apparatus 70.

The control apparatus 70 has a main control section 71, a die information providing section 72, a tie bar load distribution section 73, a tie bar load correction section 74, a displacement detection section 75, adding sections AD1 to AD4 and a burr generation discrimination section 76.

Note that, the tie bar load distribution section 73 is an embodiment of a distribution unit of a tie bar load of the present invention, the tie bar load correction section 74 is an embodiment of a correction unit of the present invention, and the displacement detection section 75 is an embodiment of a displacement detection unit of the present invention. Further, each function of the control apparatus 70 is constituted by required hardware such as a processor and software.

The main control section 71 outputs a control command for controlling each pressure control valve PCV1 to PCV4 independently so that pressure of driving oil in the cylinder chamber 9a of each cylinder for mold clamping 9A to 9D becomes desired pressure.

Further, the main control section 71 outputs a control command for controlling independently each direction control valve DCV1 to DCV4 respectively to perform a position control of the piston 8 of each tie bar 7A to 7D.

The die information providing section 72 provides information concerning a die such as shape information of the fixed die 5 and the movable die 6 and information of mounting position of them for the fixed die plate 3 and the movable die plate 4. The information is used for calculating a distribution of force acting to the fixed die 5 and the movable die 6 and the amount of a transformation generated in them.

The tie bar load distribution section 73 utilizes information concerning the die provided by the die information providing section 72 and determines a distribution of tie bar loads TL1 to TL4 that should be given to each tie bar 7A to 7D.

The displacement detection section 75 detects displacement D1 to D4 of piston 8 of each tie bar 7A to 7D generated by injection and filling of the molten metal to the cavity defined between the fixed die 5 and the movable die 6 from position information of the piston 8 detected by the position sensors POS1 to POS4.

The burr generation discrimination section 76 discriminates whether or not the molten metal is spout from between the mating faces of the fixed die 5 and the movable die 6 and burr is generated from the displacement D1 to D4 of the pistons 8 detected by the displacement detection section 75.

The burr generation discrimination section 76 outputs a discrimination signal 76s showing whether the burr is generated or not to the tie bar load correction section 74.

The tie bar load correction section 74 determines correction values M1 to M4 correcting values of the tie bar loads TL1 to TL4 for suppressing displacement of the piston 8 based on displacement of the piston 8 of each tie bar 7A to 7D detected by the displacement detecting section 75 when a discrimination signal 76s from the burr generation discrimination section 76 indicates that the burr is generated.

The adding sections ADD 1 to ADD4 adds the correction values M1 to M4 determined by the tie bar loads TL1 to TL4 and outputs them as new tie bar loads TL1' to TL4' to the main control section 71.

The main control section 71 controls loads given to the tie bars 7A to 7D to be new tie bar loads TL1' to TL4'.

Figure 6:
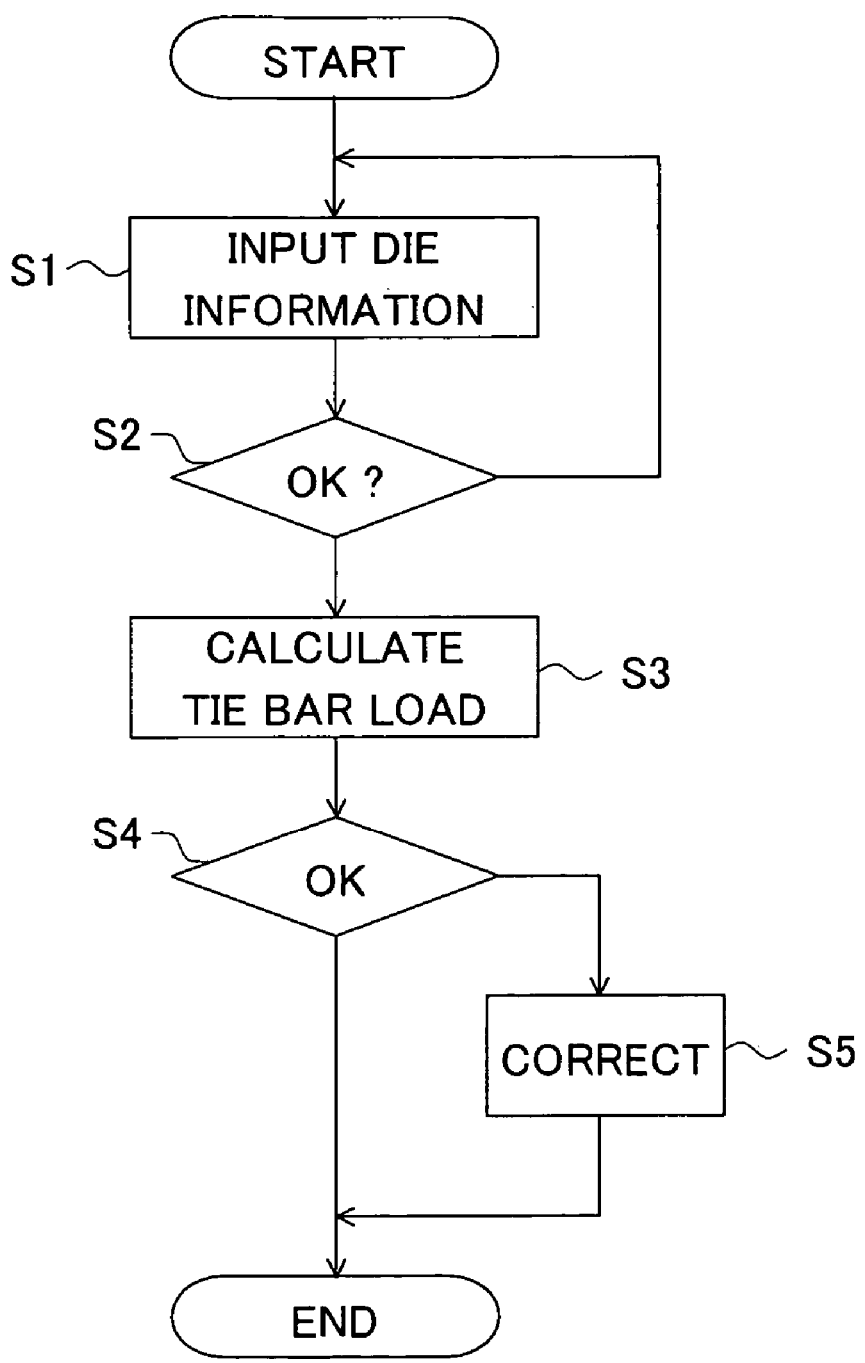
FIG. 6 is a flow chart showing an example of a processing step in the control apparatus.

Next, it will be explained about an example of processing step in the control apparatus 70 by referring a flow chart in FIG. 6.

First, an operator etc. inputs information concerning the fixed die 5 and the movable die 6 to the control apparatus 70 (step S1). This information includes sizes of the fixed die 5 and the movable die 6 and a mounting position of them. In more detail, a shape of the cavity, a position and a size of an inlet 5h are included. Therefore, a transformation and a stress distribution generated in the fixed die 5 and the movable die 6 when mold clamping can be decided from this information.

When finishing an input of information concerning the dies (step S2), a distribution of the tie bar loads TL1 to TL4 generated in the tie bars 7A to 7D is determined based on this information concerning the die (step S3).

Figure 5:
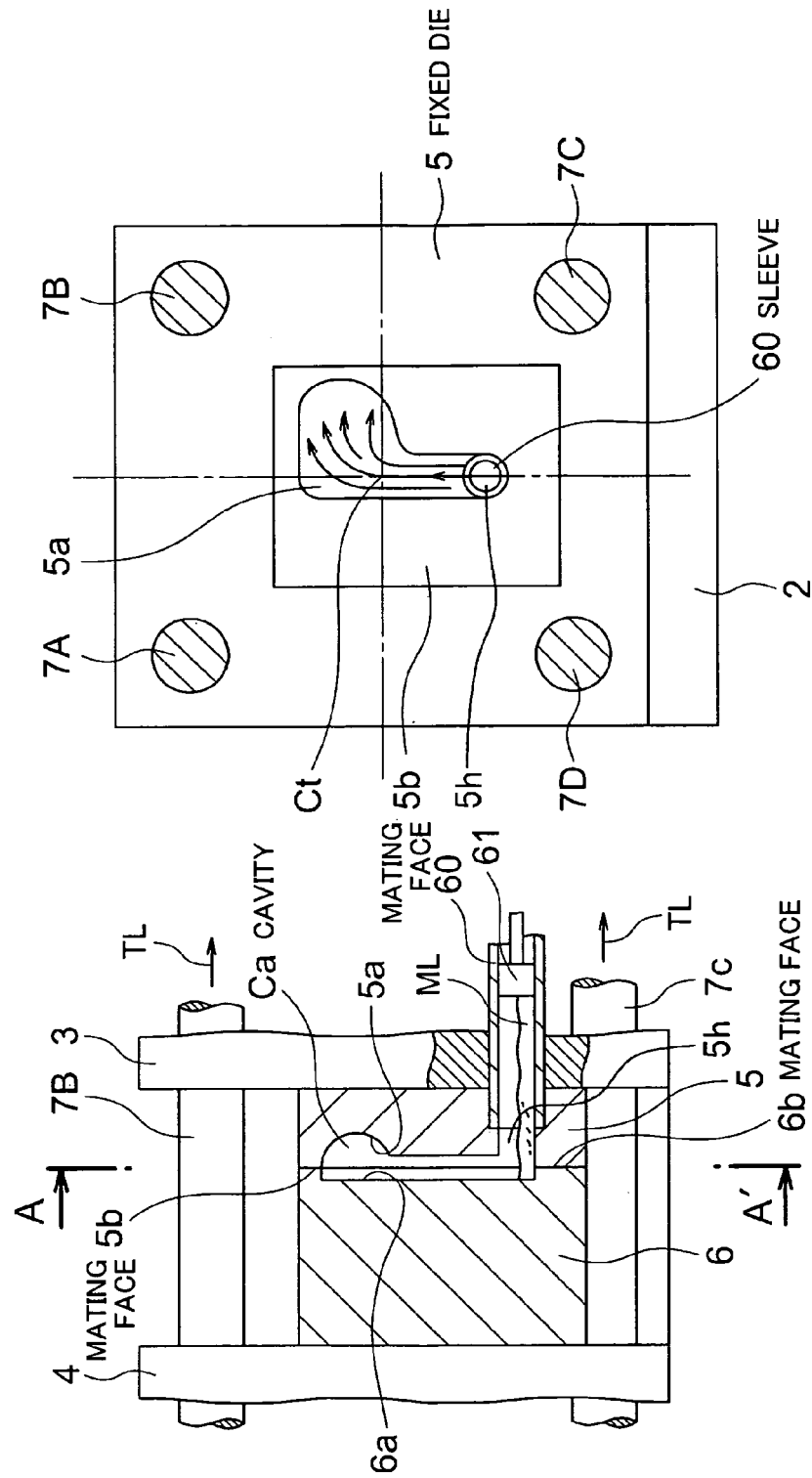
FIGS. 5A and 5B are sectional views.

FIG. 5 are views showing an example of a shape of the die, FIG. 5A is a sectional view, FIG. 5B is a sectional view in a direction of A-A' line of FIG. 5A.

As shown in FIG. 5, a distribution of the cavity Ca defined by the recess 5a of the fixed die 5 and the recess 6a of the movable die 6 is not symmetry for the center Ct of the fixed die plate 3 and the movable die plate 4, and the distribution is biased to upper right side and distributed as shown in FIG. 5B.

The four tie bars 7A to 7D are arranged symmetrically for the center Ct.

When loads of equivalent values are given to four tie bars 7A to 7D, a distribution of force acting between a mating face 5a of the fixed die 5 and a mating face 6a of the movable die 6 is approximately uniform in a portion that the cavity Ca does not exist, however, it may be not uniform in the upper right region that the cavity Ca exists. This is because a region in the vicinity of the cavity Ca of the fixed die 5 and the movable die 6 is received mold clamping force and transformed since rigidity of the above region is lower than rigidity of the other region, and parallelism between the mating faces 5b and 6b in a region in the vicinity of the cavity Ca. Therefore, spout of the molten metal is easily generated between the mating face 5b and 6b in the peripheral region that the cavity exists.

Further, fluctuation of a distribution of force acting between the mating face 5b of the fixed die 5 and the mating face 6b of the movable die 6 is caused by the fact that the die is mounted in eccentric for the center portion of the die plate to occur. It is because that in a portion nearer the tie bars 7A to 7D in the fixed die 5 and the movable die 6, stronger mold clamping force is given. Note that, FIG. 10 for explaining a second embodiment mentioned later exemplifies the case that the fixed die 5' and the movable die 6' are arranged at an eccentric position for the center Ct of the fixed die plate 3' and the movable die plate 4'.

Further, a distribution of force acting between the mating face 5b of the fixed die 5 and the mating face 6b of the movable die 6 changes due to a position of the inlet 5h (refer to FIG. 5). It is caused by the fact that rigidity of the fixed die 5 is descended in the vicinity of the inlet 5h by providing the inlet 5h, the fact that rigidity of the sleeve 60 is added to rigidity of fixed die 5 due to fixation of the sleeve 60, the fact that intensifying pressure by the plunger tip 61 influences the molten metal around the inlet 5h much more than the molten metal of the other region and so on. Therefore, force acting between the mating face 5b and the mating face 6b becomes larger or smaller in the vicinity of the inlet 5h than the other region based on these various causes.

In the tie bar load distribution section 73, the tie bar loads TL1 to TL4 given to the tie bars 7A to 7D are decided to suppress transformation in a peripheral region of the cavity Ca, enhance parallelism between the mating faces 5b and 6b and enhance uniformity of a distribution of force acting between the mating faces 5b and 6b.

Note that, an analysis of a transformation, a stress distribution and so on generated in the fixed die 5 and the movable die 6 can be automated by making known structural analysis technology to software.

After a distribution of the tie bar loads TL1 to TL4 is decided automatically, the operator judges whether or not these values are adequate (step S4), and corrects when there are disadvantages (step S5).

By steps mentioned above, a distribution of the tie bar loads is decided.

Figure 7:
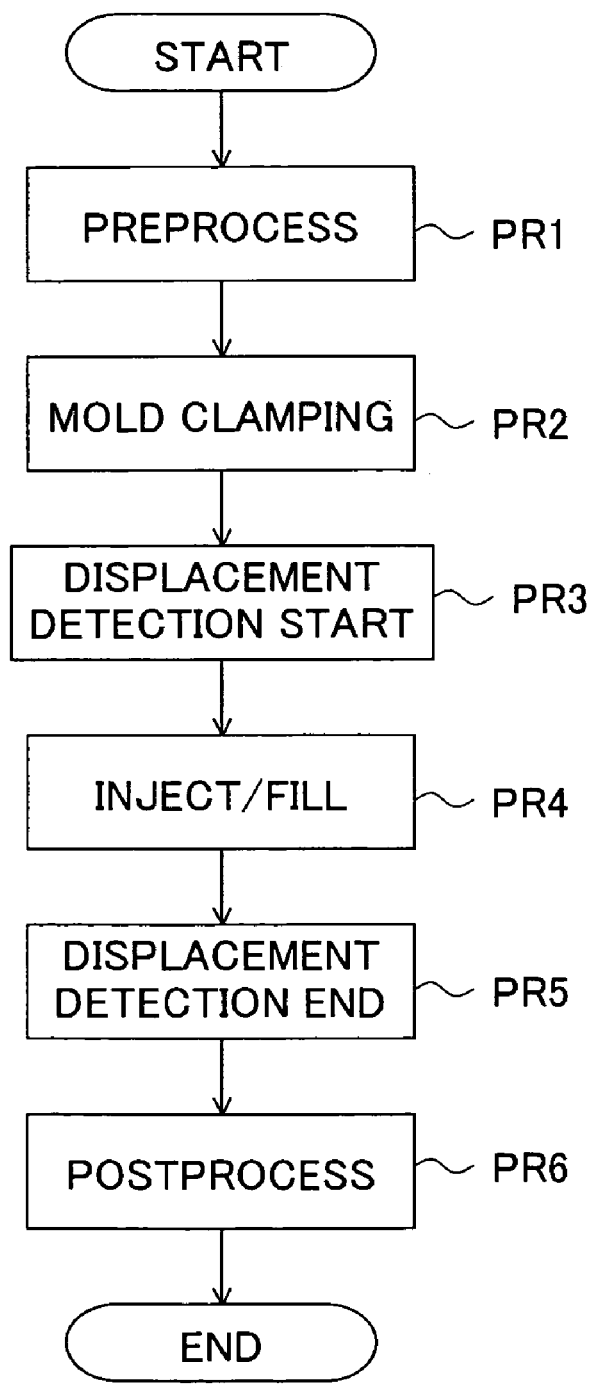
FIG. 7 is a flow sheet showing an example of a casting process.

Next, it will be explained about an example of a casting step after a distribution of the tie bar loads is decided by referring to a flow sheet shown in FIG. 7.

First, a necessary preprocess before casting such as mold thickness adjustment and mold closing is performed (process PR1).

Next, mold clamping is performed (process PR2). The control apparatus 70 controls for supply of driving oil to the cylinder chamber 9b of each cylinder for mold clamping 9A to 9D and mold clamping is performed. At this time, the tie bar loads TL1 to TL4 of a predetermined distribution are given to the tie bars 7A to 7D.

After finishing mold clamping, a detection of displacement D1 to D4 of the piston 8 of each tie bars 7A to 7D is started (process PR3). This detection is performed by the displacement detection section 75 of the control apparatus 70.

Next, a predetermined amount of the molten metal ML is supplied to the sleeve 60, the plunger tip 61 is advanced and the molten metal ML is injected and filled to the cavity Ca defined between the fixed-die 5 and the movable die 6 (process PR4).

A injection and filling process of the molten metal ML includes, for example, an injection process of advancing the plunger tip 61 to a predetermined position at low speed and next injecting the molten metal ML to the cavity Ca with switching at high speed and a pressor process of raising pressure of the molten metal ML in the cavity Ca when the cavity is filled by the molten metal ML.

In a pressor process, pressure of the molten metal ML in the cavity Ca rises sharply and the force opening the fixed die 5 and the movable die 6 acts. This force opening dies acts to each tie bar 7A to 7D, however, when the force acts to each tie bar 7A to 7D is larger than the tie bar loads TL1 to TL4, mold opening is occurred and the molten metal ML in the cavity may be spouted from between the mating faces 5b and 6b. When mold opening is occurred, displacement is occurred in at least any of pistons 8 of the tie bars 7A to 7D. Note that, a process of the case that displacement is occurred in the piston 8 will be described later.

After finishing the injection and filling process, the detection of displacement D1 to D4 of the piston 8 of each tie bar 7A to 7D is ended (process PR5).

Next, after casting a cast in the cavity Ca, a post-process of opening the fixed die 5 and the movable die 6, ejecting the cast and squirting mold release agent to the fixed die 5 and the movable die 6 and so on is performed (process PR6).

Figure 8:
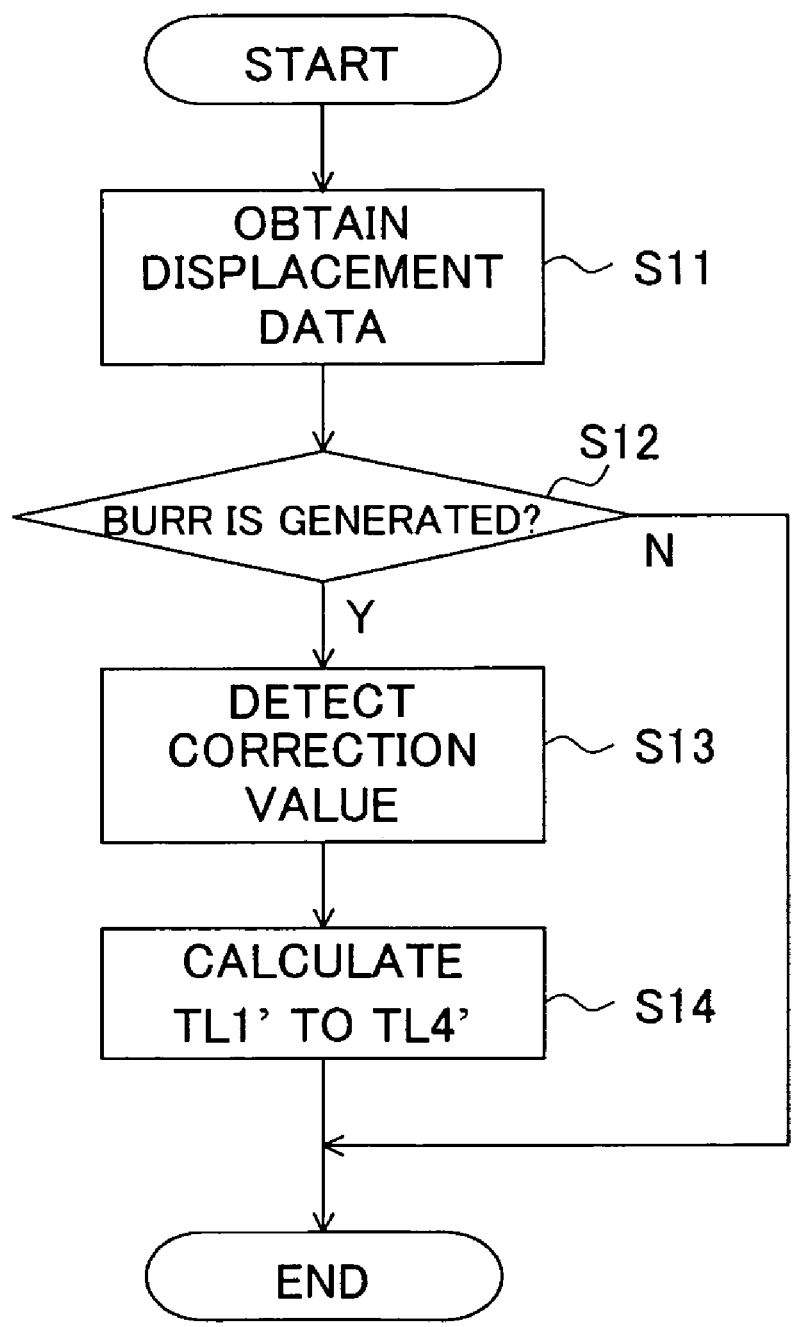
FIG. 8 is a flow chart showing an example of processing of the control apparatus after displacement data of a piston is obtained.

FIG. 8 is a flow chart showing an example of a process of the control apparatus 70 after displacement D1 to D4 data of the piston 8 is obtained.

In the control apparatus 70, when the displacement detection section 75 obtains displacement data D1 to D4 of the pistons 8 (step S11), the displacement detection section 75 judges whether or not burr is generated by using that data (step S12).

Figure 9:
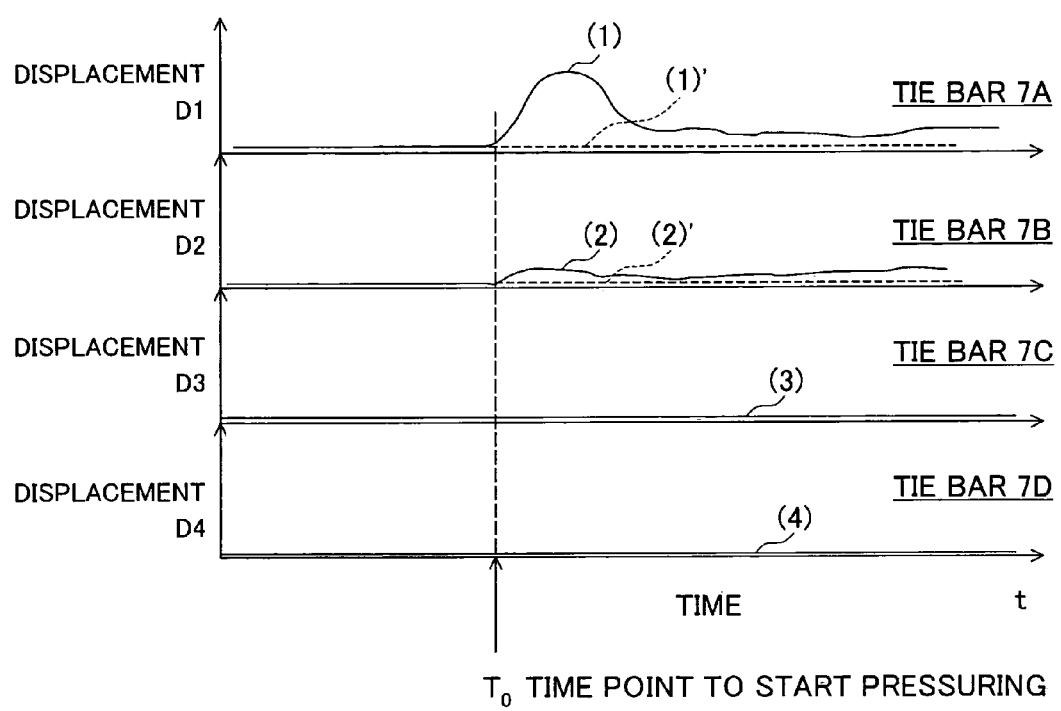
FIG. 9 is a graph showing an example of the displacement data of the piston when burr is occurred in the casting process.

Here, FIG. 9 is a graph showing an example of displacement data D1 to D4 of the piston 8 when burr is generated in a casting process.

As shown in graphs (1) and (2) of FIG. 9, when displacement is generated in at least either of displacement data D1 to D4 of the pistons 8, the burr generation discrimination section 76 discriminates that the burr is generated in a cast production by mold clamping.

When it judged that the burr was generated, the tie bar load correction section 74 calculates correction values M1 to M4 correcting the predetermined tie bar loads TL1 to TL4 to suppress the displacement of the piston 8 in a next casting cycle (step S13).

For example, the correction values M1 to M4 increase a tie bar load in response to the amount of displacement and the correction values are decided as correction values so that burr is not generated. In an example shown in FIG. 9, correction values M1 and M2 increasing the tie bar load 7A TL1 and the tie bar load 7B TL2 in response to the amount of displacement are decided respectively.

Further, the optimum correction values M1 to M4 that the burr is not generated may be searched from displacement data D1 to D4 of the piston 8 obtained by a plurality of casting cycles.

In the control apparatus 70, after the correction values M1 to M4 are decided, these are added to the predetermined tie bar loads TL1 to TL4 respectively and the new tie bar loads TL1' to TL4' are provided (step S14).

When pressure control of the cylinder chamber 9a of each cylinder for mold clamping 9A to 9D is performed based on the new the tie bar loads TL1' to TL4' when mold clamping, as shown in a graphs (1)' and (2)' of FIG. 9, the amounts of displacement of the piston 8 is suppressed and generation of burr is prevented.

As mentioned above, according to the present embodiment, since a distribution of the tie bar loads TL1 to TL4 is adjusted before casting a production based on information concerning the fixed die 5 and the movable die 6, parallelism between the mating faces 5b and 6b due to asymmetric property of a structure and a mounting position can be prevented and the spout of the molten metal from the mating faces 5b and 6b can be prevented.

Further, according to the present embodiment, in a state of adjusting a distribution of the tie bar loads TL1 to TL4 in advance, even if the spout of the molten metal from between the mating faces 5b and 6b is generated, the spout of the molten metal from between the mating faces 5b and 6b can be prevented by correcting each tie bar load TL1 to TL4 respectively based on displacement D1 to D4 of the piston 8 of the tie bars 7A to 7D.

Second Embodiment

Figure 10:
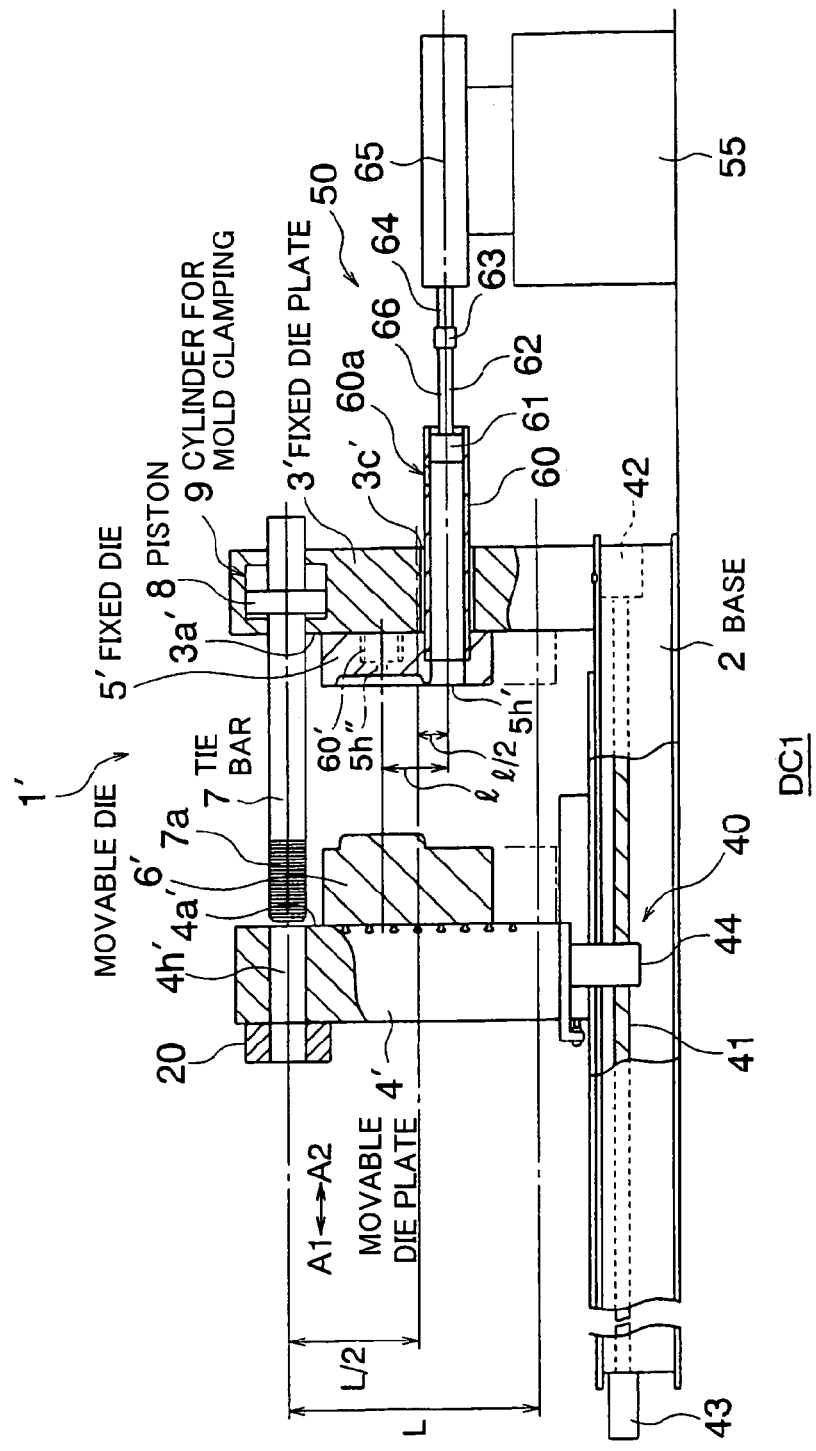
FIG. 10 is a front view partially including a sectional view showing a constitution of a mechanical portion of a molding machine according to a second embodiment of the present invention.

FIG. 10 is a front view partially including a sectional view showing a constitution of a mechanical portion of a die casting machine according to a second embodiment of the present invention. Note that, about a construction similar to the mold clamping apparatus of the first embodiment, a code equivalent to the first embodiment will be applied and the explanation will be omitted.

A die casting-machine DC1 has a mold clamping apparatus 1' and an injection apparatus 50.

The mold clamping apparatus 1' has a constitution similar to the mold clamping apparatus 1 of the first embodiment. However, constitutions of a fixed die plate 3' and a mounting surface of the die 3a' and 4a' in a movable die plate 4' are different from the first embodiment.

Note that, FIG. 10 exemplifies the case that a movable die 6' having a projection and a fixed die 5' having a recess are mounted on the mold clamping apparatus 1', a cavity is defined by the projection and the recess, however, it is hardly different from the case that the movable die 6 having a recess and the fixed die having a recess are mounted as FIG. 1 essentially.

The injection apparatus 50 has a sleeve communicated with a cavity, an injection plunger 66 able to slide in the sleeve 60 and an injection cylinder 65 driving the injection plunger 66. The injection apparatus 50 is supported on a pedestal 55 provided on a floor. Note that, in the second embodiment, an apparatus for moving the injection apparatus 50 up and down is not provided in the pedestal 55. However, an apparatus for moving the injection apparatus 50 up and down may be provided.

The sleeve 60 is inserted to a notch portion 3c' of the fixed die plate 3' and fitted and inserted to an inlet 5h' provided to penetrate the fixed die 5'. Steps are provided so that diameter is reduced from the fixed die plate side 3' to the movable die plate side 4' in the inlet 5h', the sleeve 60 is positioned in a clamping direction by the steps. Note that, the injection apparatus 50 may not be moved up and down for the fixed die plate about the die casting machine 1 as mentioned later, the notch portion 3c' can be provided small in comparison with the conventional die casting machine. For example, the sleeve 60 may be fitted for the notch portion 3c', or it may be provided to the size at a degree to adjust finely the position of the sleeve 60.

The injection plunger 66 has a plunger tip 61 fitting the sleeve 60 and a plunger rod 62 that the plunger tip 61 is coupled with its apical portion. The plunger rod 62 is coupled with a piston rod 64 of the injection cylinder 65 via a coupling. The injection cylinder 65 is driven by oil pressure and it moves the piston rod 64 to an axis direction.

It will be explained about an example of a mounting structure of a die in the die casting machine 1.

Figure 11A:
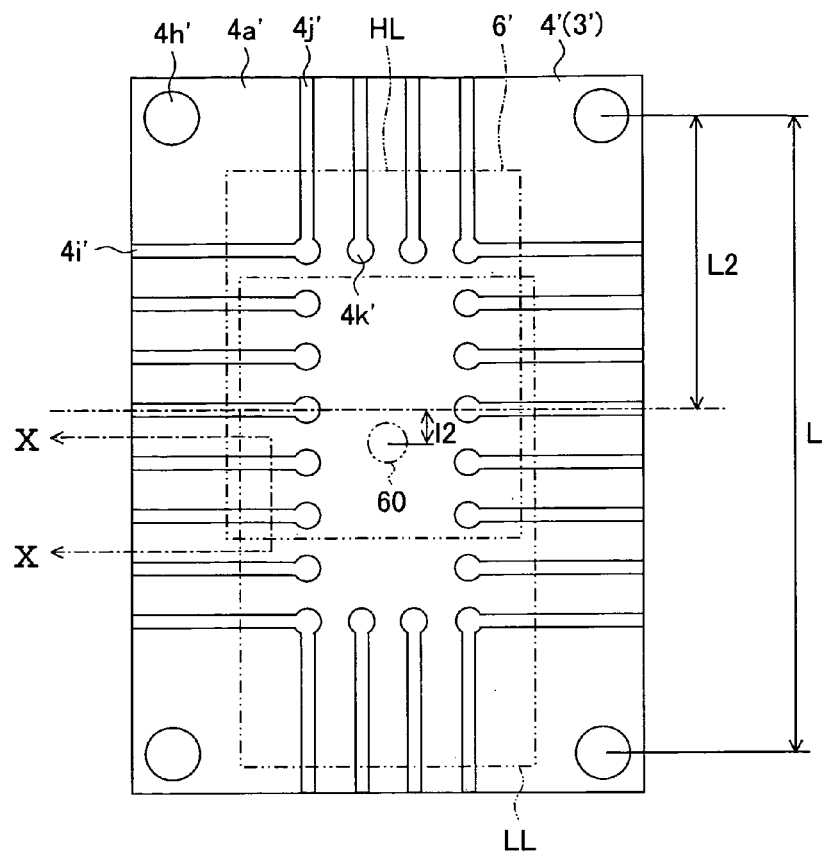
FIGS. 11A and 11B are views showing an example of a mounting structure of the die and a die plate.
Figure 11B:
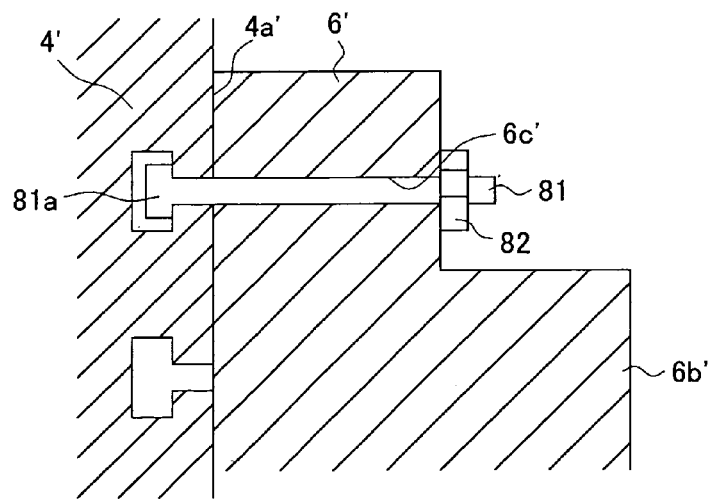

FIG. 11 are views showing a mounting surface 4a' that the movable die 6' of the movable die plate 4' is mounted, FIG. 11A is a front view that the mounting surface 4a' is seen from the fixed die plate side and FIG. 11B is a sectional view at X-X line in FIG. 11A. Note that, since the mounting surface 3a' where the fixed die 5' of the fixed die plate 3' is mounted is similar to the mounting surface 4a', an explanation of it will be omitted. However, the above mentioned notch portion 3c' is provided in the fixed die plate 3'.

As shown in FIG. 10 and FIG. 11A, it is provided so that groove portions 4i' and 4j' having an approximately T shape extends to vertical and horizontal direction respectively at approximately regular intervals. The groove portions 4i' and 4j' extend from a border to a center side and a circular hole 4k' having a diameter equivalent to a width of the bottom of the groove portion 4i' and 4j' is provided in the edge of the center side. In the bottom of the groove portion 4i' and 4j', a bolt head 81a of a bolt 81 can be inserted from the border side or the circular hole 4k' as shown in FIG. 11B. The bolt 81 is inserted to a through-hole 6c' provided in the movable die 6', the bolt 81 and a nut 82 are screwed and the movable die 6' is fixed to the movable die plate 4'.

The groove portion 4i' and 4j' are provided with extending for a range wider than the movable die 6', and the movable die 6' can be fixed at a proper position horizontal for the movable die plate 4' as shown in FIG. 10 and FIG. 11A. However, a range able to be mounted is determined by a range where the groove portion 4i' is provided and a position of the through-hole 6c' provided in the movable die 6', and the mounting position can be provided in a range from the highest mounting position HL to the lowest mounting position LL.

The highest mounting position HL and the lowest mounting position LL may be provided arbitrarily, however, for example, the highest mounting position HL may be provided to a position in the case of arranging a die of a predetermined size that the inlet 5h' is provided in the lower portion to position the inlet 5h' for the sleeve 60 fixed at a predetermined position and the lowest mounting position LL may be provided to a position in the case of arranging a die of a predetermined size that the inlet 5h' is provided in the higher portion to position the inlet 5h' for the sleeve 60 fixed at a predetermined position. As a result, the die can be mounted on the die plate without changing a position of the sleeve 60 even if the inlet 5h' is provided in either of the higher or the lower portion.

A higher and lower position of the sleeve 60 is provided in the lower by ½ as half of the maximum moving range 1 from the medium of interval L of the center of the tie bars 7 arranged in the top and the bottom as shown in FIG. 10 and the 11A. The maximum moving range 1 is a distance between the highest position and the lowest position of the inlet in the case of assuring that a plurality if kinds of dies that is made as an object of the die casting machine DC1. In FIG. 1, the lowest inlet 5h' is shown and the highest inlet 5h" is shown. Note that, it is possible to provide the sleeve 60 upper by ½ from the medium of the tie bars 7, and the sleeve 60' provided when provided in the upper is shown with a dotted line.

Note that, the higher and the lower position of the sleeve 60 may be provided so that an unbalanced tie bar load 7 in a range of an object of the die becomes the minimum. Namely, when amounts such as a size of a plurality of kinds of the dies that are made as an object of the die casting machine DC1 and a position of the inlet are decided, a relationship of an arrangement position of each die in the case of positioning a plurality of kinds of the dies for the fixed sleeve 60 is decided. Then, the position of the sleeve 60 that an eccentric load becomes the minimum-based on a relationship of an arrangement position of each die is decided. For example, the position of the sleeve 60 so that a fluctuation of the load acting to the mating face of the die to be arranged in the highest step and the die to be arranged in to in the lowest step becomes the minimum is decided.

It will explained in the following about an example of a changing method of the fixed die 5' and the movable die 6' in the die casting machine DC1 having the above-mentioned mounting structure.

First, the movable die plate 4' is driven to the fixed die plate 3' side and the fixed die 5' and the movable die 6' are united. Then, the bolt 81 and the nut 82 are uncoupled, and the fixed die 5' and the movable die 6' are hanged with a crane and so on.

Next, in a state that the fixed die 5' and the movable die 6' that are mounted newly are united, the fixed die 5' and the movable die 6' are hanged and conveyed to between the fixed die plate 3' and the fixed die plate 4'. Then, a position of the fixed die 5' and the movable die 6' is decided so that a position of the inlet 5h' conforms to a position of the sleeve 60. Note that, between from removal of the dies until this positioning, the sleeve 60 is not moved in the opening or closing direction (vertical direction) for the fixed die plate 3'.

When the positioning is ended, the movable die plate 4' is advanced to the fixed die plate side gradually with performing a fine adjustment so that the sleeve 60 is fitted and inserted to the inlet 5h'. Note that, at this time, the position of the sleeve 60 may be adjusted finely to a direction perpendicular to the opening or closing direction (vertical direction). Then, the bolt 81 and the nut 82 are tightened temporarily and the fixed die 5' and the movable die 6' are mounted to the fixed die plate 3' and the movable die plate 4'. Afterward, a check and an adjustment of each portion such as the position of the fixed die 5' and the movable die 6' are performed and the bolt 81 and the nut 82 are screwed firmly.

The mold clamping apparatus 1' operates in common with the mold clamping apparatus 1 of the first embodiment. Namely, decision, correction and so on of the tie bar loads TL1 to TL4 are performed so that a distribution of a force acting to the mating faces of the dies becomes uniform as explained in FIG. 6 to FIG. 9.

The following effect can be obtained according to the die casting machine DC1 of the above second embodiment.

Usually, in a mold clamping apparatus, the die is arranged in the center between a plurality of tie bars so that a distribution of force acting between the mating faces of the dies becomes uniform. On the contrary, the inlet of the die is provided based on conditions such as a shape of the cavity defined by pair of the die, and a position of the inlet is different by the die. Therefore, when the die held by the die plate is tooling-changed, the position of the inlet is changed at the every time, it is necessary to change a position of the injection apparatus including an injection sleeve coupled to the inlet, the injection plunger sliding in the injection sleeve and so on.

However, according to the die casting machine DC1 of the second embodiment, since the die is mounted at a proper position of the die plate in concert with a position of the sleeve 60, it is not necessary to make the injection apparatus 50 up and down. Furthermore, since a distribution of the tie bar loads TL1 to TL4 is adjusted depending on a mounting position of the die and so on as mentioned above, spout of the molten metal from between the mating faces 5b and 6b can be prevented. Therefore, for example, an apparatus moving the injection apparatus up and down can be omitted. The operating time for changing a position of the injection apparatus can be reduced. Further, excess gall with the injection sleeve and the injection plunger arising from an inability to position the injection sleeve and the injection plunger (centering) correctly and so on can be prevented and the lifetime of the injection sleeve and so on can be extended.

The present invention is not limited to the above embodiment.

In the above-mentioned embodiment, when the molten metal spouted from between the mating faces 5b and 6b after adjusting a distribution of the tie bar loads TL1 to TL4 in advance, it was described a constitution to correct the tie bar loads TL1 to TL4, however, it is possible to define a constitution to distribute the tie bar loads TL1 to TL4 without adjusting a distribution of the same and adjust values of the tie bar loads TL1 to TL4 based on displacement D1 to D4 of the pistons 8 of the tie bars 7A to 7D. In this case, software for performing a structural analysis of the die becomes unnecessary.

Number of the tie bars is not limited to four. There only has to be two tie bars. Note that, it is preferable that the tie bars are provided by three or more for enabling to control three-way moment acting to the die. It is desired that number or a position of the tie bars is provided symmetrically in a horizontal direction for facilitating uniformization of mold clamping force in a horizontal direction. It is desirable that number or a position of the tie bars is provided symmetrically in a vertical direction for facilitating uniformization of mold clamping force in a vertical direction.

In the above-mentioned embodiment, it was a constitution that the cylinder for mold clamping 9 was provided in the fixed die plate 3 and the half nut 20 was provided in the movable die plate 4, however, the present invention can be applied to the mold clamping apparatus that a cylinder for mold clamping 9 is provided in a movable die plate 4 and a half nut 20 is provided in a fixed plate 3.

Further, in the above-mentioned embodiment, it was explained about the case that the mold clamping apparatus of the present invention was applied to the die casting machine, however, it can be applied to a mold clamping apparatus of the other molding machine such as plastic injection molding machine.

The constitution that the dies can be held at a plurality of positions in the die plate is not limited to a thing that the T-groove is provided in a range wider than the die defined as an object. For example, a clamping unit holding a die may be provided movably along a mounting surface of a die plate.

What is claimed is:

1. A mold clamping apparatus comprising:
    a fixed die plate fixed on a base and holding one of a pair of dies;
    a movable die plate holding the other of the pair of the dies and provided in the opening or closing direction on the base movably;
    a plurality of tie bars having pistons and coupled sections and dividing mold clamping force given to the dies between the pistons and the coupled sections;
    a plurality of cylinders for mold clamping equipped in one of the fixed die plate or the movable die plate, accommodating the pistons of a plurality of the tie bars respectively, and to which pressured operating fluid for generating the mold clamping force is supplied;
    a plurality of uniting units being equipped in another of the fixed die plate or the movable die plate and uniting releasably with a plurality of the tie bars respectively by meshing with coupled sections of a plurality of the tie bars respectively;

a tie bar load distribution unit for deciding a distribution of loads divided by a plurality of the tie bars based on information concerning the dies, and a control unit for controlling pressure of the operating fluid of a plurality of the cylinders for mold clamping independently to become the loads of the decided distribution.

2. A mold clamping apparatus as set forth in claim 1, wherein the information concerning the die includes shape information of the die and mounting position information to the fixed die plate and the movable die plate of the die.

3. A mold clamping apparatus as set forth in claim 1, further comprising:

a displacement detection unit for detecting displacement of the piston of a plurality of the tie bars generated by injection and filling of a molding material to a cavity defined by the pair of the dies, and a correction unit for correcting the load decided by the tie bar load distribution unit to suppress the displacement based on displacement detected by the displacement detection unit.

4. A mold clamping apparatus as set forth in claim 1 further comprising a pressure detection unit for detecting fluid pressure of the operating fluid of a plurality of the cylinders for mold clamping, wherein the control unit controls pressure of the operating fluid of a plurality of the cylinders for mold clamping by referring pressure detected by the pressure detection unit.

5. A mold clamping apparatus of a molding machine injecting and filling a molding material to the cavity defined by a pair of dies, wherein a mold clamping apparatus comprises:

a fixed die plate fixed on a base and holding one of the pair of the dies;

a movable die plate holding the other of the pair of the dies and provided in a opening or closing direction on the base movably;

a plurality of tie bars having pistons and coupled sections and dividing mold clamping force given to the dies between the pistons and the coupled sections;

a plurality of cylinders for mold clamping equipped in one of the fixed die plate or the movable die plate, accommodating the pistons of a plurality of the tie bars respectively, and to which pressure-adjusted operating fluid for generating the mold clamping force is supplied;

a plurality of uniting units being equipped in another of the fixed die plate or the movable die plate and uniting releasably with a plurality of the tie bars respectively by meshing with coupled sections of a plurality of the tie bars respectively;

a displacement detection unit for detecting displacement of the piston of a plurality of the tie bars generated by injection and filling of a molding material to the cavity, and a control unit adjusting pressure of the operating fluid supplied to a plurality of the cylinders for mold clamping independently to suppress displacement detected by the displacement detection unit.

6. A molding machine comprising:

a fixed die plate fixed on a base and holding one of a pair of dies;

a movable die plate holding the other of the pair of the dies and provided in the opening or closing direction on the base movably;

a plurality of tie bars having pistons and coupled sections and dividing mold clamping force given to the dies between the pistons and the coupled sections;

a plurality of cylinders for mold clamping equipped in one of the fixed die plate or the movable die plate, accommodating the pistons of a plurality of the tie bars respectively, and to which pressured operating fluid for generating the mold clamping force is supplied;

a plurality of uniting units being equipped in another of the fixed die plate or the movable die plate and uniting releasably with a plurality of the tie bars respectively by meshing with coupled sections of a plurality of the tie bars respectively;

a tie bar load distribution unit for deciding a distribution of loads divided by a plurality of the tie bars based on information concerning the dies;

a control unit for controlling pressure of the operating fluid of a plurality of the cylinders for mold clamping independently to become the loads of the decided distribution;

an injection sleeve coupled with a cavity defined by the pair of the dies via an inlet provided in one of the pair of the dies, and an injection plunger advancing in the injection sleeve and injecting and filling a molding materials to the cavity, wherein the fixed die plate is possible to hold one of the dies at a plurality of positions in a direction perpendicular to the opening or closing direction, and the movable die plate is possible to hold the other of the dies at a plurality of positions in a direction perpendicular to the opening or closing direction.

7. A molding machine as set forth in claim 6, wherein the fixed die plate has a plurality of T-grooves arranged parallel and being able to insert a bolt head of a bolt fixing the one of a pair of dies for the fixed die plate, the movable die plate has a plurality of T-grooves arranged parallel and being able to insert a bolt head of a bolt fixing the other of the pair of the dies for the fixed die plate, a plurality of the T-grooves of the fixed die plate is formed in a range wider than width of the one of a pair of the dies in an arrangement direction, and a plurality of the T-grooves of the movable die plate is formed in a range wider than width of the other of the pair of the dies in an arrangement direction.

8. A molding machine as set forth in claim 6, wherein information concerning the dies includes information of a position of the inlet.

9. A mold clamping apparatus comprising:

a fixed die plate fixed on a base and holding one of a pair of dies;

a movable die plate holding the other of the pair of the dies and provided in a opening or closing direction on the base movably;

a plurality of tie bars having pistons and coupled sections and dividing mold clamping force given to the dies between the pistons and the coupled sections;

a plurality of cylinders for mold clamping, equipped in one of the fixed die plate or the movable die plate, accommodating the pistons of a plurality of the tie bars respectively, and to which pressured operating fluid for generating the mold clamping force is supplied;

a plurality of uniting units being equipped in another of the fixed die plate or the movable die plate and uniting releasably with a plurality of the tie bars respectively by meshing with coupled sections of a plurality of the tie bars respectively;

a tie bar load distribution unit for deciding a distribution of loads divided by a plurality of the tie bars based on information concerning the dies, and a control unit for controlling pressure of the operating fluid of a plurality of the cylinders for mold clamping independently to become the loads of the decided distribution, wherein the fixed die plate is possible to hold the one of a pair of the dies at a plurality of positions in a direction perpendicular to the opening or closing direction, and the movable die plate is possible to hold the other of the pair of the dies at a plurality of positions in a direction perpendicular to the opening or closing direction.

* * * * *